Dec. 5, 1967  C. C. GRANGER  3,356,181
FRUIT PICKING APPARATUS
Filed June 15, 1966  4 Sheets-Sheet 1

Charles C. Granger
INVENTOR.

BY Clarence A. O'Brien
and Harvey B. Jacobson
Attorneys

Charles C. Granger
INVENTOR.

Dec. 5, 1967 C. C. GRANGER 3,356,181
FRUIT PICKING APPARATUS
Filed June 15, 1966 4 Sheets-Sheet 3
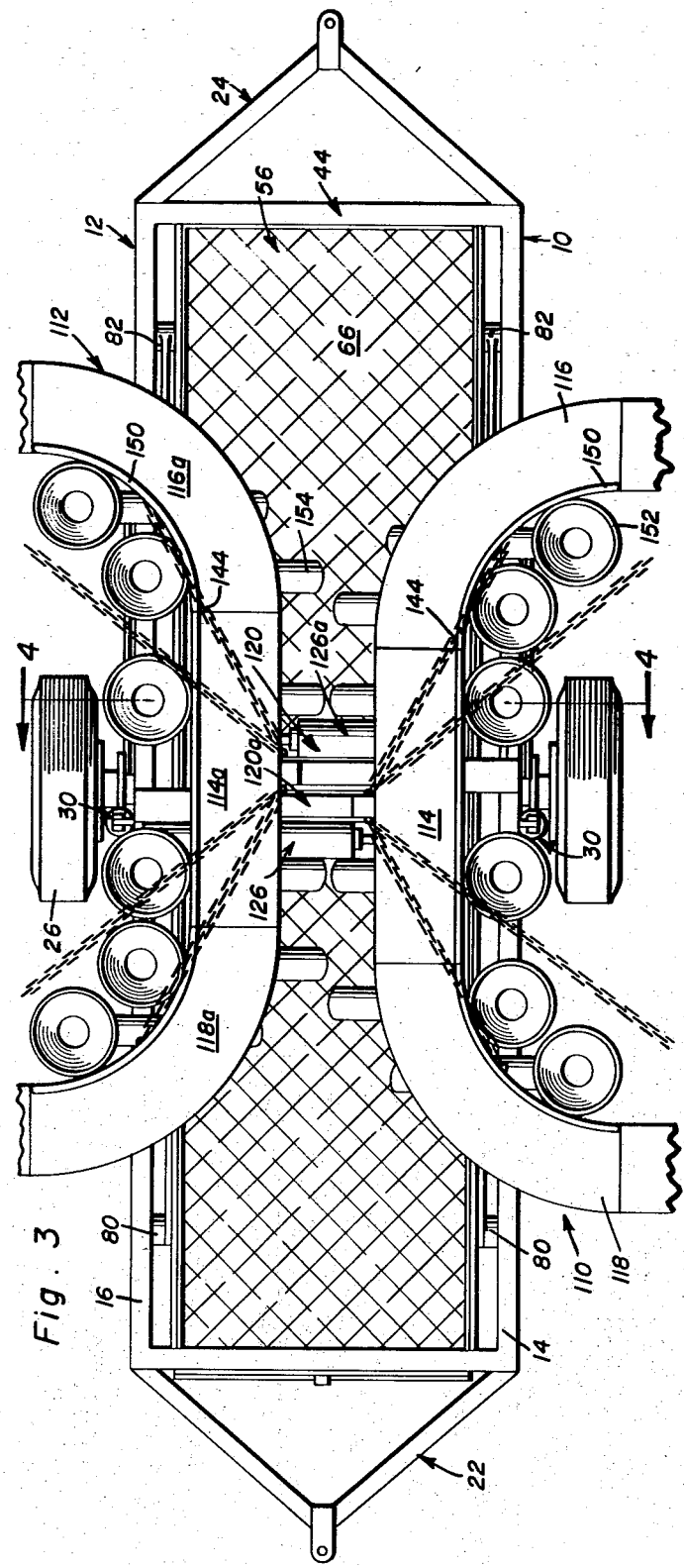
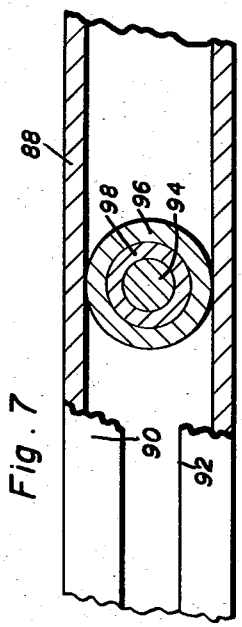
Charles C. Granger
INVENTOR.

Dec. 5, 1967
C. C. GRANGER
3,356,181
FRUIT PICKING APPARATUS
Filed June 15, 1966
4 Sheets-Sheet 4
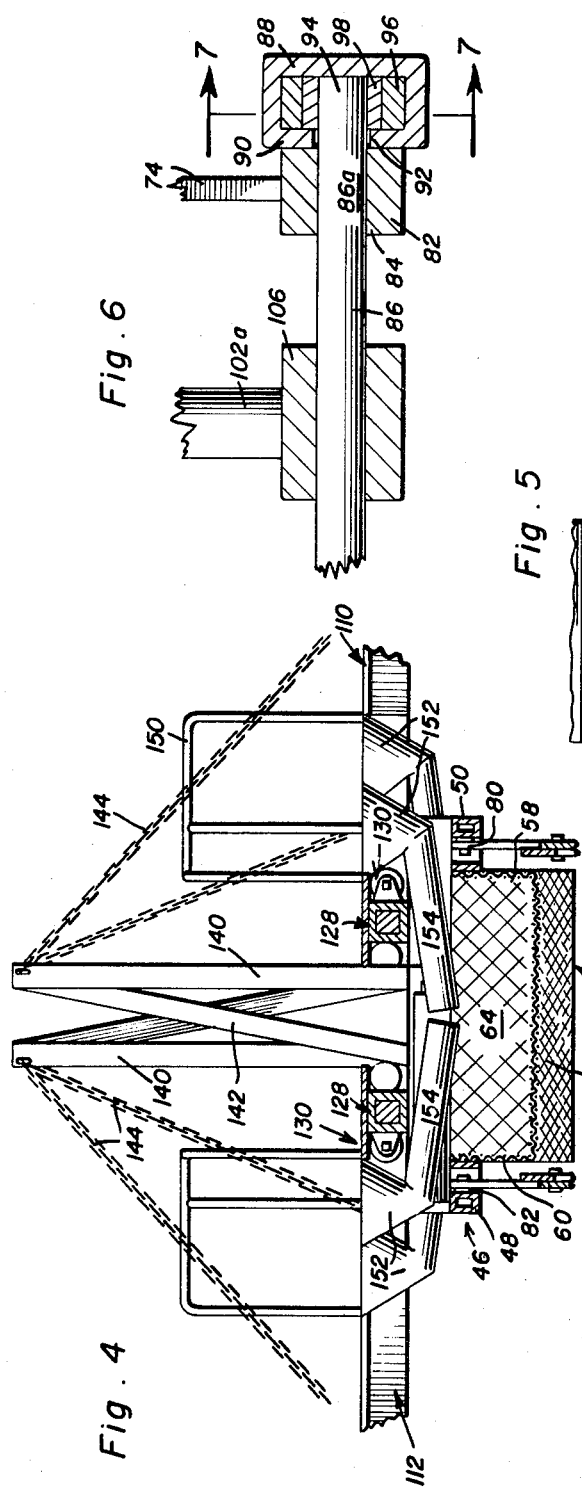
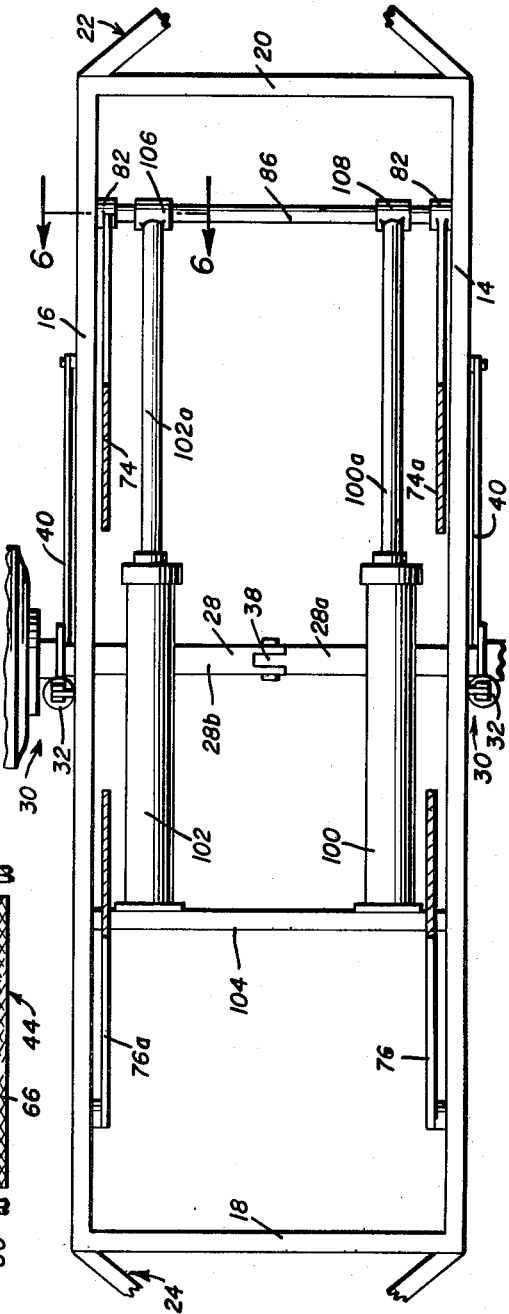
Charles C. Granger
INVENTOR.
BY *Clarence A. O'Brien*
*and Harvey B. Jackson*
Attorneys

United States Patent Office 3,356,181
Patented Dec. 5, 1967

3,356,181
FRUIT PICKING APPARATUS
Charles C. Granger, 1203 Chestnut St.,
Henderson, N.C. 27536
Filed June 15, 1966, Ser. No. 557,664
12 Claims. (Cl. 182—129)

The present invention generally appertains to improvements in agricultural apparatuses and more particularly relates to novel improvements in fruit picking apparatuses, which are adapted to provide a perch for a fruit picker in the manual picking of fruit from trees.

Orchard fruits, such as apples, pears and the like, must be handpicked and handled with care, because they are easily bruised and damaged and, if bruised or damaged, such fruit must be discarded and cannot be sold with the other undamaged fruit.

It can be appreciated that time and expense are of the essence in the picking of fruit because the fruit must be picked when it is ripe and pickers must be paid very high wages. And yet, the total crop must be sold, within a competitive price range, so that the faster, more inexpensively and productively and, with less damage to the fruit, that such orchard fruits can be picked for packing, the greater will be the profit to the orchard owner, when placing the crop yield on the competitive market.

The use of ladders with pickers ascending and descending the ladders and carrying sacks or the like can no longer be employed because of the high wages that must be paid to the workers and the fact that the operation is time-consuming and is damaging to the trees.

Because of these factors, many types of apparatuses have been devised, which essentially comprise a mobile frame and a crane-like apparatus which supports a perch on which a picker is positioned, the apparatus being movable upwardly and downwardly and inwardly and outwardly from the frame. Modifications of such basic construction have been devised, which include various types of tubular discharge means and collection means and the like.

However, all known apparatuses suffer from the drawbacks that they are expensive to manufacture and maintain and that they cannot accommodate a large number of workmen and cannot be used with a high degree of ease and efficiency on the part of the workmen so that the picking job can be accomplished faster and with no damage to the fruit.

Accordingly, an important object of the present invention is to provide a fruit picking apparatus which overcomes the drawbacks in known devices of this type and to provide an apparatus which will enable a number of pickers to pick all of the fruit from a tree, as the apparatus is moved along a row of trees, with the workmen being able to move around the tree with ease and efficiency to insure that all of the fruit is picked from the trees.

Another important object of the present invention is to provide a fruit picking apparatus which will enable workmen to move freely around a tree, starting from the top of the tree and working down to the bottom of the tree and to deposit the fruit, very speedily and efficiently, into a common receptacle, without any damage to the fruit.

A further important object of the present invention is to provide a mobile frame, having a self-leveling means, and supporting a common fruit receptacle, which is movable into selected heights and from the opposing sides of which catwalks are projectable into various lateral, selected positions, relative to side-by-side trees along rows of trees in an orchard, whereby pickers or workmen can walk safely and easily along the catwalks and pick the fruit from the trees and deposit the fruit into the common receptacle.

A further important object of this invention is to provide novel means, whereby the pickers can deposit the picked fruit into the common receptacle, in a facile and efficient manner and without damaging the fruit.

Another important object of the present invention is to provide vertically and laterally adjustable catwalks, which are adapted to encompass a tree and are adapted to be moved upwardly and downwardly and inwardly and outwardly, relative to the tree, and on which workmen can walk safely and easily around the tree.

A still further important object of the present invention is to provide a fruit picking apparatus, which includes a novelly constructed common fruit receptacle or basket, that is mounted on a mobile frame for vertical movement in a rectilinear path, relative to a ground engaging mobile supporting frame, so that it is adjustable into various heights above the mobile frame, which has self-leveling ground-engaging wheels, in a straight path, upwardly and downwardly, with respect to the mobile frame, whereby the same may be moved between side-by-side trees as the mobile frame is moved through the rows of side-by-side trees.

Another important object of the present invention is to provide catwalks, which are supported by the common receptacle so that they can be adjusted inwardly and outwardly, with respect thereto, and with respect to opposing trees and which are formed so that they can encompass or circle the trees and which have means, whereby pickers can pick the fruit and deposit the fruit into the receptacle from their positions on the catwalks.

Another important object of the present invention is to provide a novel and improved fruit picking apparatus which will enable the fruit to be picked from the trees in an orchard in a faster, better and more economical fashion, thereby increasing the yield to the economic advantage of the orchard owner while at the same time enabling the fruit pickers to pick the fruit in a less tedious and tiresome way.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a top plan view thereof;

FIGURE 4 is a transverse, vertical sectional view, taken substantially on line 4—4 of FIGURE 3;

FIGURE 5 is a longitudinal, cross-sectional view, illustrating in greater detail the means for raising and lowering the common receptacle or basket in a rectilinear path, relative to the supporting mobile frame;

FIGURE 6 is a detail, fragmentary sectional view taken on line 6—6 of FIGURE 5;

FIGURE 7 is a detailed, vertical, longitudinal sectional view taken substantially on line 7—7 of FIGURE 6; and, FIGURE 8 is a fragmentary, perspective view of a slightly modified form of catwalk construction.

Figure 1:
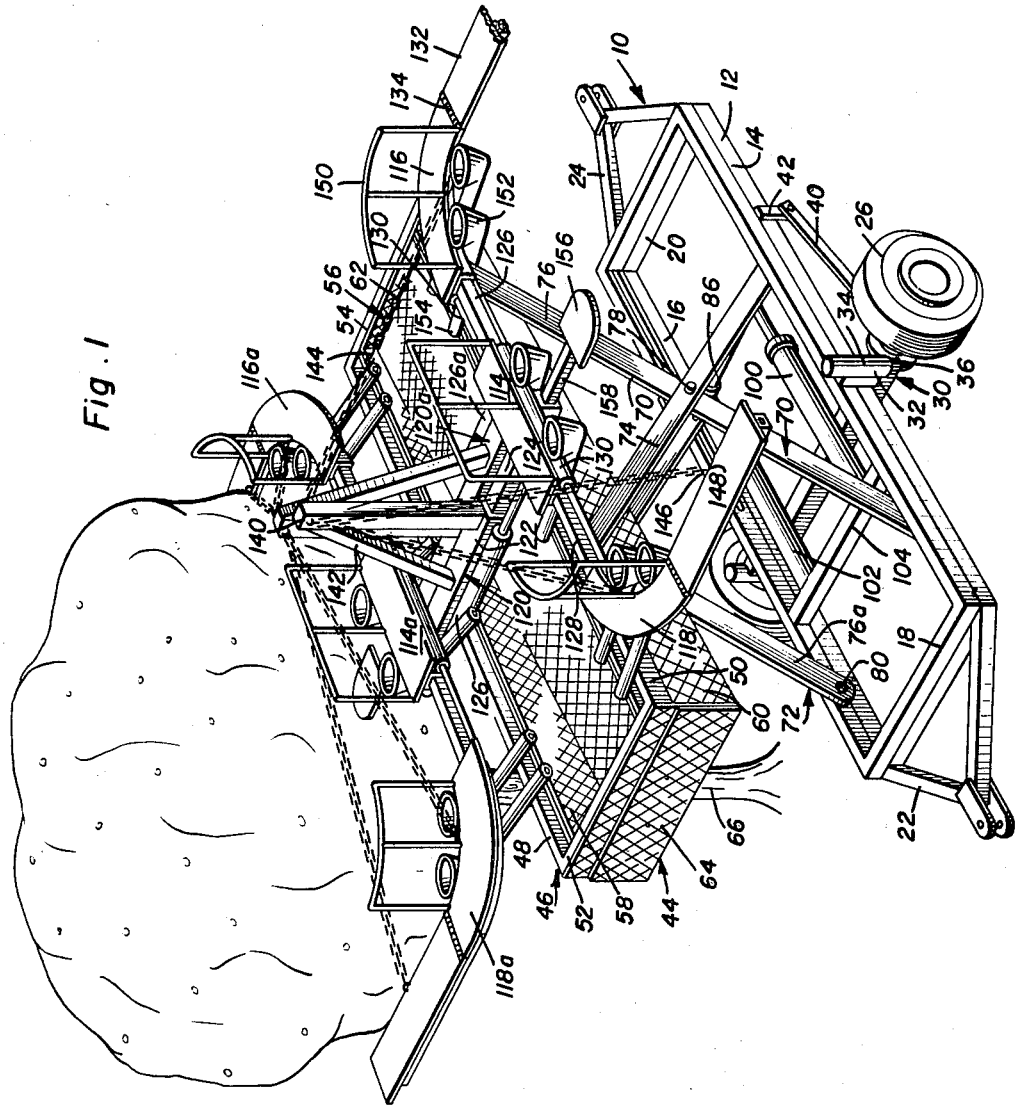
FIGURE 1 is a perspective view of the fruit picking apparatus, which is constructed in accordance with the present invention, and showing the same in position relative to a fruit tree.

Referring now more particularly to the accompanying drawings, the fruit picking apparatus 10 includes an elongated mobile frame 12, which is substantially rectangular and is of a width so that it can be easily moved between rows of trees in an orchard.

The frame 12 is composed of opposing sides 14 and 16 and opposing ends 18 and 20. The ends 18 and 20 are each provided with hitch assemblies 22 and 24, so that the frame can be towed from either end by a draft vehicle, though it is envisioned that the frame could be self-propelled.

The frame is supported by ground-engaging wheels 26, which are positioned intermediate the ends 18 and 20 and which are supported by a sectional axle 28.

In the latter respect, the ground-engaging wheels 26 are provided with self-leveling means 30 which is in the nature of a hydraulic cylinder arrangement 32, the hydraulic cylinder 34 being vertically secured to the outsides of the sides 14 and 16 of the frame and having its piston rod 36 pivotally attached to the assembly for each of the ground-engaging wheels 26. The axle 28 is composed of two sections 28a and 28b, which are joined at their inner ends by a hinged knuckle joint 38, whereby the axle can pivot, at its joined center, about a longitundinally disposed, horizontal axis.

The wheel assemblies are each braced by a brace bar 40, which is pivoted at one end to the wheel assembly and pivoted at its outer end to a fixed vertical brace bar 42 carried by the sides 14 and 16 of the frame, as shown in FIGURES 1 and 5.

The fruit picking apparatus includes an elongated, substantially rectangular, common receptacle or basket assembly 44, which is formed of a length and width, substantially equal to the overall length and width of the mobile frame 12 and which is attached thereto and supported thereby for movement vertically in a rectilinear path, so that the same can be raised and lowered to selected heights between adjoining trees of side-by-side rows, with the frame being positioned between the adjoining trees.

The common fruit receptacle or basket assembly 44 comprises an open rectangular frame 46, which includes opposing sides 48 and 50 and opposing ends 52 and 54. The frame is preferably formed from tubular, non-circular stock, so that it is very sturdy but is formed from lightweight material, so that it can be light while still being very sturdy and rigid, because of its rectangular cross-sectional shape.

The frame 46 supports a lightweight but sturdy open-mesh receptacle or basket 56, which may be formed from suitable material, so that it has reticulated side walls 58 and 60 and opposing, reticulated end walls 62 and 64 and a reticulated bottom wall 66.

The bottom wall 66 slopes downwardly from the shorter end wall 62 toward the higher end wall 64, with the side walls sloping accordingly. The purpose of this is to permit the end wall 64 to function as an opening gate, while enabling the receptacle to serve as a chute, due to its sloped bottom and the particular construction thereof, whereby after the receptacle has become filled with fruit, it can be more or less self-unloading, upon opening of the end wall 64.

Figure 2:
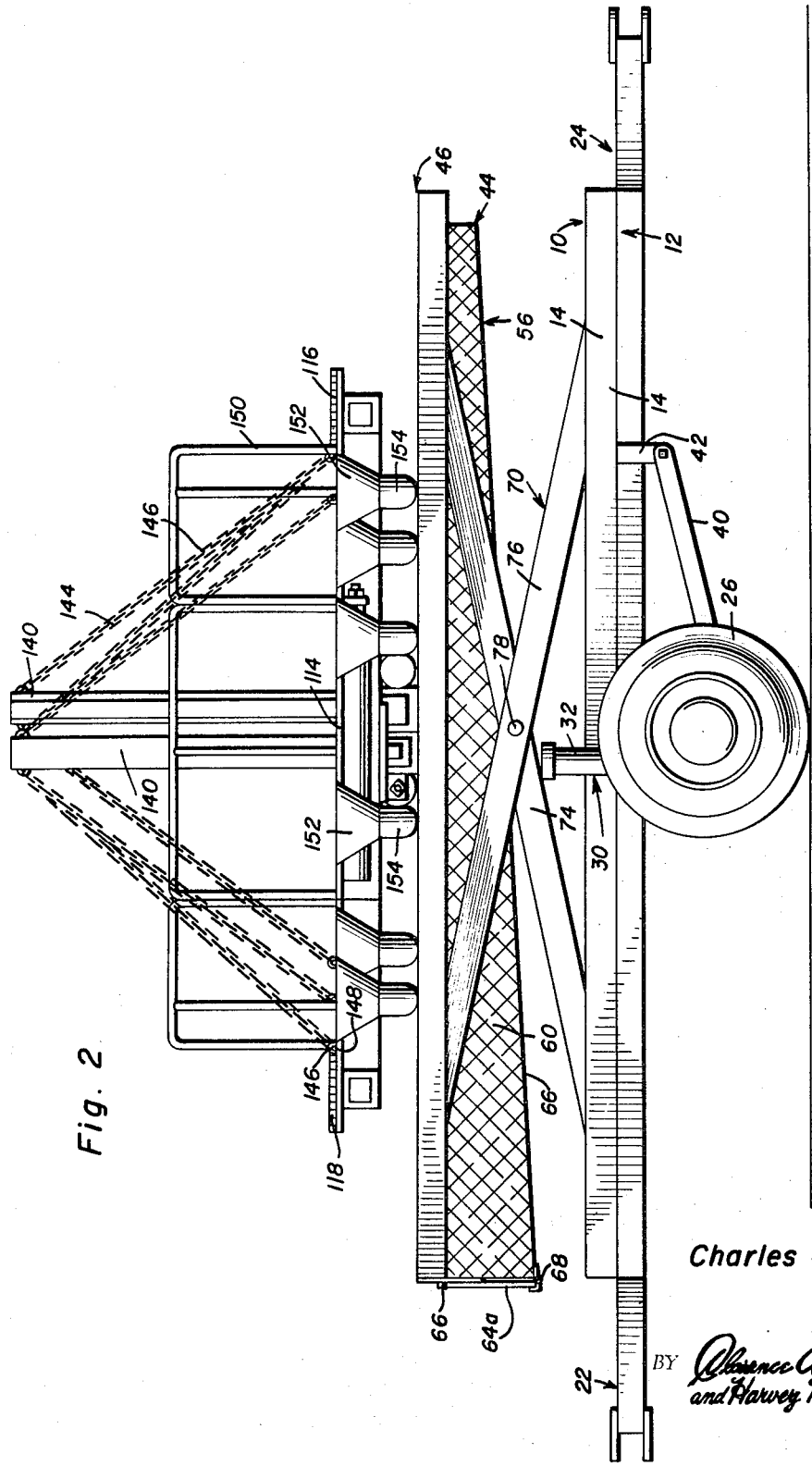
FIGURE 2 is a side elevational view, partly in section, of the fruit picking apparatus of FIGURE 1.

In the latter respect, as shown in FIGURE 2, the end wall 64 has a major hinged section 64a, which is hinged by hinge means 66 and which is held in a locked position by a latch or lock means 68.

Means is provided for mounting the frame 46 of the common receptacle or basket assembly 44 on the mobile supporting frame 14 and includes a pair of crossed lever arms 70 and a similar pair of crossed lower arms 72, which function in a scissors jack fashion.

The pair of arms 70 includes levers 74 and 76 which are pivotally connected together, intermediate their ends, by a pivot pin 78. The upper ends of the lever arms 74 and 76 are secured by pivot pin assemblies 80 and 82 to the opposing sides 48 and 50 of the frame 46 for the common receptacle or basket assembly 44. The construction of the lever arms for the pair of arms 72 and the attachment thereof to the frame 46 is identical.

The lower ends of the lever arms 76 and 76a of the pairs of supporting and lifting levers 70 and 72 are secured to the insides of the sides 14 and 16 of the frame 12, adjacent the end 18, by fixed pivots 80. The lower ends of the lever arms 74 and 74a terminate in collars 82, which have bores 84, disposed transversely of the lever arms and freely circumposed on a rod 86. The rod 86 is disposed transversely between the sides 14 and 16 of the mobile frame. The sides 14 and 16 are formed from non-circular tubular stock so that they have inner and outer spaced side walls 88 and 90, with the side walls 90, being formed with elongated, axial slots 92, from a point adjacent the center axle 28 to one of the ends, such as the end 20. The slots 92 accommodate the end portions of the rod 86, the end portions 86a terminating in ends 94, which have rollers 96 rotatably circumposed thereon by means of bearing collars 98. In this fashion, the ends of the cross rod 86 are free to move, without friction loss, in the tubular sides 14 and 16, which constitute side rails, due to their peculiar construction, as shown in FIGURE 6.

The cross rod 86 is mounted for movement, lengthwise of the mobile, ground-engaging supporting frame, in order to enable the scissors-type levers to function to lift and lower the common receptacle assembly in a rectilinear path with respect to the supporting frame 12.

Means is provided for moving the cross rod 86 so as to raise and lower the common receptacle and such means includes hydraulic, double-acting rams 100 and 102, which are secured to a crossbar 104 and which have their rods 100a and 102a terminating in collars 106 and 108, the collars being freely circumposed on the rod 86.

Therefore, the cross rod 86 responds to the power strokes of the piston rods 100a and 102a, which are actuated by the cylinders, through suitable control means (not shown) so as to move to-and-fro on the sides 14 and 16 of the supporting frame 12 and thereby raise and lower the common receptacle assembly 44 through the pivoted leverage system defined by the crossed levers.

Means is provided for accommodating pickers or workmen in a manner so that they can walk freely around a tree and pick fruit from a tree and discharge it through a discharge means into the common receptacle or basket 56. Such means includes catwalk assemblies 110 and 112. Each catwalk assembly includes a center plank or platform 114 and extensible end sections 116 and 118. It is believed that a specific description of the construction and mounting of the catwalk assembly 110 will suffice, inasmuch as the catwalk assemblies 110 and 112 are identically constructed and actuated and are provided so that they can be extended laterally into various positions, outwardly from the sides of the common receptacle 56, whereby workmen can pick fruit from opposing, spaced apart trees of a row, as the frame is positioned in the pathway between the rows. This will greatly enhance the speedy picking of the fruit from the trees.

The catwalk assembly 110, as aforestated, includes the center section 114, which is supported by a telescopic tubular support means 120. Such support means 120 includes a stationary outer section 122, which is of non-circular tubular stock and which is fixed to one side of the rigid frame 46 and has an inner telescopic companion section 124, which slides inwardly and outwardly with respect thereto and on which the platform 114 is securely mounted. The telescopic supporting structure is square for rigidification purposes and the section 124 easily slides inwardly and outwardly from the section 122 and supports the platform 114, which is mounted thereupon, as can be seen from FIGURE 1.

Similarly, a telescopic support means 120a is provided for the platform 114a. Thus, the platforms 114 and 114a are supported by transverse telescopic supporting means, which are carried transversely by the supporting frame 46 for the common receptacle or basket, intermediate the ends thereof and well above the bottom 64 thereof, so as not to interfere with the accumulation of fruit in the receptacle or basket 56 and the emptying of the receptacle or basket.

The center platforms 114 and 114a, which are supported by the telescopic supporting means 120 and 120a are disposed, intermediate the ends of the frame 46 and are adapted to be moved inwardly and outwardly, laterally relative to the frame, as can be appreciated from a consideration of FIGURES 1 and 3.

Hydraulically actuated cylinder-piston units 126 and 126a are provided for moving the platforms 114 and 114a inwardly and outwardly, laterally of the common receptacle and its supporting frame, with the platforms being movable in independent fashion and carrying the catwalks 110 and 112 inwardly and outwardly with them. In this respect, the center platforms 114 and 114a serve as the supports for the end sections 116 and 118 of the catwalks.

The end sections 116 and 118 are substantially curved or arcuate, as can be seen, so that they will curve around the sides of the tree T, as shown in FIGURE 1.

The end sections or platforms 116 and 118 are extensible longitudinally from the ends of the center platforms 114 and 114a and are supported by telescopic, tubular supporting means 128 and actuated by hydraulic cylinder arrangements 130, whereby the curved or arcuate end sections 116 and 118 may be moved longitudinally of the receptacle. In this respect, the hydraulic actuating means for the catwalk assemblies 110 and 112 are operable, in independent fashion, so that the distance of the placement of the end sections 116 and 118 relative to the center catwalk or platform 114 is independently controlled and the distance of the curved end platforms 116 and 118 is independently controlled, not only with respect to each other, but also with respect to the independently controlled end sections or platforms 116a and 118a of the catwalk assembly 112.

A substantial majority of trees are square hedged and, for this reason, the outer ends of the arcuate end sections 116 and 118, in connection with the catwalk assembly 110 and the comparable end sections 116a and 118a of the catwalk assembly 112 are provided with end extensions 132. Such end extensions are rigidified and are hinged by a transverse hinge means 134 to the outer ends of the arcuate sections.

Figure 8:
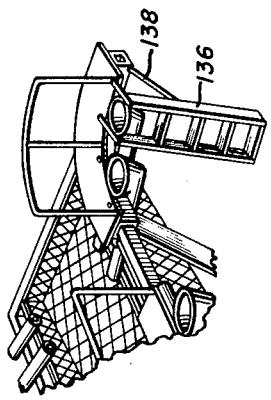

If desired, as shown in FIGURE 8, the end sections 116 may be provided with ladders 136, which are adapted to be attached thereto in a suspended manner by sliding hook means 138 so that they are safely suspended from the inner edges of the end sections 116, enabling a picker to move downwardly from a standing position on the arcuate platforms 116, 116a or 118 and 118a.

For safety purposes, means is provided for insuring that the end sections 116 and 118 of the catwalk assembly 110 and extension platforms 132 are securely and safely held in substantial coplanar relationship with the securely horizontal disposed center section 114. This is equally true of the sections of the catwalk assembly 112.

Thus, a braced post 140 projects upwardly from the supporting or fixed tubular housings of each of the telescopic supporting sections 120 and 120a for the center platforms 114 and 114a, the posts being rigidified by brace bars 142 and being held in secure vertical positions. Flexible elements, such as chains 144, have their inner ends securely anchored to the upper ends of the posts and are provided at their lower, outer ends with hooks 146, which are adapted to be attached to upstanding apertured ears 148 formed on the arcuate end sections and extensions of the catwalk assemblies, as shown in FIGURE 1.

For safety purposes, the outer edges of the platform sections 114, 116, 118 and even the extension platform sections 132 and, of course, the complemental sections of the catwalk assembly 112, are formed with upright handrails or guard rails 150, as shown in FIGURE 1.

Means is provided whereby workmen, moving safely and easily along the platforms of the catwalk assemblies 110 and 112, can easily discharge fruit into the common receptacle, as the fruit is picked from the branches of the trees by the pickers or workmen. Such means includes funnels 152, which are of frustoconical shape and have open major upper ends, with their minor open lower ends in communication with tubes or conduits 154, the open ends of which overlie the basket or receptacle 56. The funnels 152 are disposed at the outer edges of the platform sections of the catwalks and are positioned so that the open major ends lie substantially coplanar with the catwalks, whereby they do not interfere with the positioning of the catwalks, relative to the tree branches or with the movements of the workmen on the catwalks. The receptacles and associated funnels may be made of any particular material, though a somewhat soft, sturdy flexible material is desired, so that the fruit is not injured, as the fruit is dropped into the receptacles and conveyed by the funnels into the common receptacle or basket.

The particular shape of the funnels 152, with regard to their open inlet ends, is not specifically critical and the same could be more elongated, with respect to the length of the platform sections, so as to not project too far beyond the outer side edges of the platform sections. In this respect, a single funnel, which would be of elongated configuration, could be provided for each platform section and would have a number of conduits for the discharge of the fruit therefrom into the common receptacle.

If found necessary, means is provided so that a picker can be placed out to the center of the tree to pick fruit from the centermost portion of the tree within the confines of the extending branches. As shown in FIGURE 1, such means includes a seat-like platform 156, which has a supporting arm 158 that is telescopically arranged within the telescoping outer section of the telescopic support means 120 and 120a for each of the catwalk assemblies. Such center platform 156 would be extended inwardly toward the center of the tree between the platform sections 132 at the ends of the curved end sections 116 and 118, as shown in FIGURE 1.

It can be appreciated that the operation of the fruit picking apparatus is extremely simple. The supporting frame 12, with the receptacle and catwalk assemblies in their lowered and inwardmost positions, wherein they would be within the confines of the boundaries delineated by the ends and sides of the supporting frame, would be moved by a tractor or similar traction vehicle between the rows of trees. The frame would be positioned between opposing trees and pickers would assume positions on the platform sections of the catwalks. The frame 56 would then be raised to the desired height, by means of the hydraulically actuated, scissors-type jack arrangement, the common receptacle moving upwardly between the opposing spaced trees and moving in a rectilinear path. The catwalk assemblies 110 and 112 would then be moved outwardly and the end extensions or end platforms would be moved longitudinally, so that the actwalks would encompass the entire tree, as shown in FIGURE 1.

Therefore, it can be appreciated that the entire tree can be encompassed and, as a matter of fact, two spaced opposing trees can be encompassed so that only a few workmen are needed since the workmen can move on the platforms of the catwalk assemblies and walk around the trees to pick the fruit, which is discharged through the funnel conduit assemblies into the common receptacle, without fear of bruising or otherwise damaging the fruit.

Because of the multiple or compound movements of the apparatus, the same can be raised to any desired height and the workmen can be positioned at any desired height and can be positioned at any desired placement, laterally and longitudinally with respect to the common receptacle.

After the receptacle is full, it is a simple matter to empty the same through the discharge or outlet end.

Accordingly, it can be appreciated that a very simple, compact and sturdy apparatus is provided which will enable a minimum number of workmen to pick fruit from a large orchard, in a very fast and expeditious manner, without damaging the fruit.

The foregoing is considered as illustrative only of the principles of the invention. Further, since numerous modi-

What is claimed as new is as follows:

1. A fruit picking apparatus comprising a mobile supporting frame, a receptacle unit for fruit, means mounting the receptacle unit on the supporting frame for vertical movement, actuating means for raising and lowering the receptacle unit relative to the supporting frame, a catwalk assembly positioned in adjacency to the receptacle unit, and means for moving said assembly laterally and longitudinally relative to the frame and receptacle unit so that said assembly can be positioned to encompass a tree at selected variable heights in relationship with the receptacle unit whereby workmen can move along the catwalk assembly and pick fruit from a tree and deposit the picked fruit in the receptacle unit.

2. The invention of claim 1, wherein said receptacle unit includes an open framework and a reticulated receptacle carried thereby, said supporting means and actuating means being operatively connected between the supporting frame and the framework.

3. The invention of claim 2, wherein said reticulated receptacle has a sloping bottom wall and an openable end wall at the lower end of the bottom wall for gravitational discharge of fruit therefrom.

4. The invention of claim 1, wherein said mounting means includes pairs of pivotally connected crossed levers having upper ends pivotally attached to the receptacle unit, said levers having first lower ends pivotally connected to the supporting frame and second lower ends and means attaching said second lower ends to the supporting frame for movement longitudinally of said frame.

5. The invention of claim 4, wherein said frame has opposing rails and said last means includes a cross rod having rollers riding in said rails and said second lower ends having collars freely circumposed on the rod.

6. The invention of claim 5, wherein said actuating means includes fluid operated rams having piston rods terminating in collars circumposed on the rod, a transverse brace bar on the frame, said rams being mounted longitudinally of the frame and parallel with the rails between the brace bar and the cross rod.

7. The invention of claim 1, wherein means is provided and extends from the catwalks to the receptacle unit whereby workmen deposit picked fruit into the receptacle unit from any position on the catwalk assembly.

8. The invention of claim 1, wherein said catwalk assembly is composed of longitudinally extensible platform sections including arcuate end sections and means for selectively extending said sections.

9. The invention of claim 1, wherein telescopic supporting means is provided and is connected between the receptacle unit and the catwalk assembly for lateral movement of the catwalk assembly relative to the receptacle unit and means for moving said catwalk assembly laterally.

10. The invention of claim 1, wherein said receptacle unit is movable vertically relative to the frame in a rectilinear path.

11. The invention of claim 10, wherein said receptacle unit has opposing sides and a laterally extensible catwalk assembly is provided on each side of the receptacle unit.

12. The invention of claim 1, wherein said supporting frame is provided with leveling means.

References Cited

UNITED STATES PATENTS

| | | | |
|---|---|---|---|
| 3,085,650 | 4/1963 | Merk | 182—148 |
| 3,259,369 | 7/1966 | Gridley | 182—141 |
| 3,272,282 | 9/1966 | Sanders | 182—63 |
| 3,311,191 | 3/1967 | Hiyama | 182—63 |

REINALDO P. MACHADO, *Primary Examiner.*